United States Patent [19]
Jandrasi et al.

[11] 3,842,861
[45] Oct. 22, 1974

[54] DOUBLE DISC SEAL VALVE

[75] Inventors: Frank J. Jandrasi; Howard A. Purvis, both of Houston, Tex.

[73] Assignee: Tapco International, Inc., Houston, Tex.

[22] Filed: Sept. 27, 1973

[21] Appl. No.: 401,508

[52] U.S. Cl.............. 137/628, 137/637, 137/613, 251/172, 251/302
[51] Int. Cl............................................ F16k 19/00
[58] Field of Search................... 137/613, 628, 637; 251/172, 298, 302

[56] References Cited
UNITED STATES PATENTS

| | | | |
|---|---|---|---|
| 1,684,651 | 9/1928 | Wayman | 137/613 X |
| 1,826,941 | 10/1931 | LaMont | 137/613 X |
| 3,145,969 | 8/1964 | VonZweck | 251/172 |
| 3,233,862 | 2/1966 | Marsh | 251/172 |
| 3,337,178 | 8/1967 | Gordon | 137/613 UX |

Primary Examiner—Harold W. Weakley
Attorney, Agent, or Firm—James F. Weiler; Jefferson D. Giller; William A. Stout

[57] ABSTRACT

A double disc seal valve provided with two independently operable disc valves, a double bellows pressure sealing system sealing each disc valve protected from the erosive action of solids or entrained solids flow, and an interdisc chamber that is pressurized to form an aerodynamic or hydrodynamic seal to provide additional seal of high pressure, high temperature, erosive solid or fluid flow systems. A control system is provided which sequences the operation of the disc valves, pressurization of the bellows system and pressurization of the interdisc chamber on closing, and releases the pressure from the bellows system and interdisc chamber and then opens the disc valves upon opening the valve.

5 Claims, 5 Drawing Figures

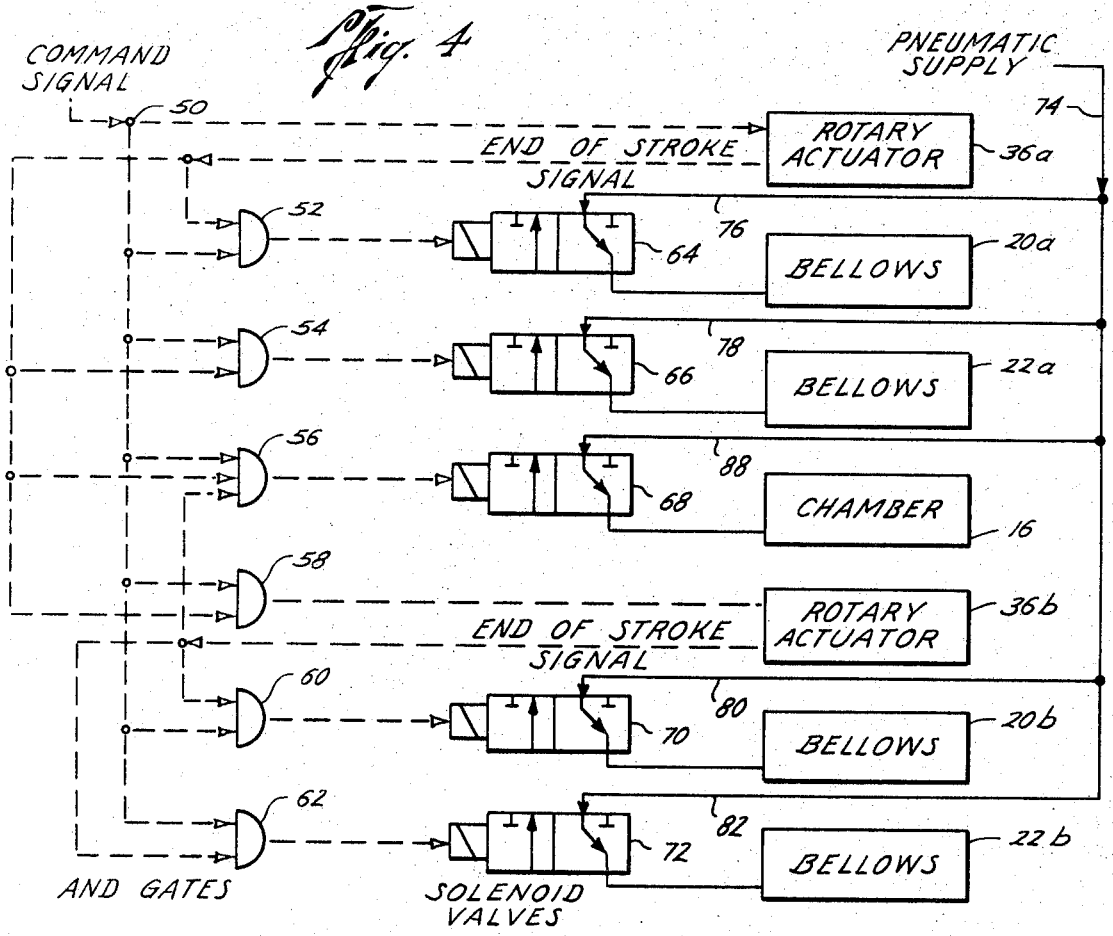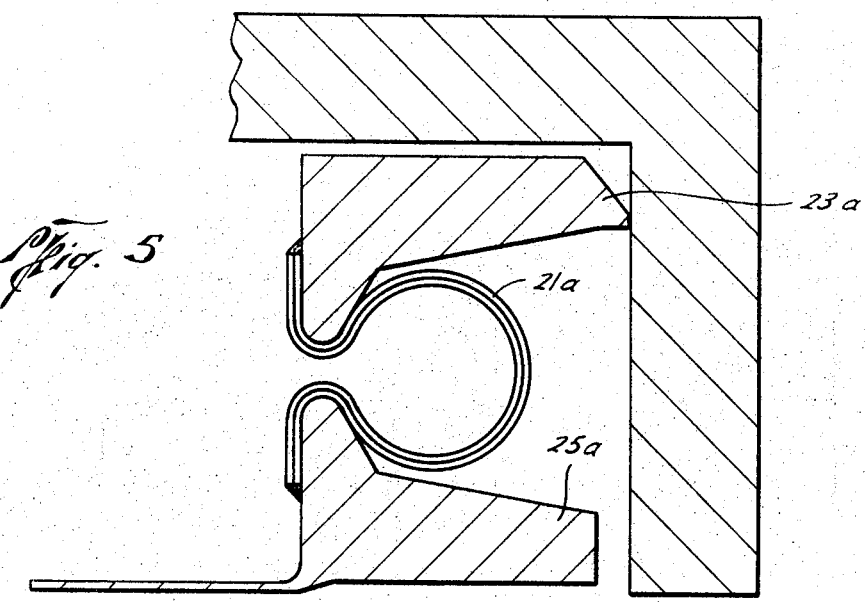

DOUBLE DISC SEAL VALVE

BACKGROUND OF THE INVENTION

Conventional positive seal systems use ball valves for high temperature and high pressure flow systems. At lower pressures and temperatures, gate valves are used.

Field experience has shown that in solids flowing systems a seal cannot be maintained with a ball valve because of powder entrapment, while gate valves are unsuitable at high pressures and temperatures because of distortion associated with flat plates and the very heavy plate thicknesses required to support the high pressures.

The foregoing disadvantages and problems are overcome, and the present invention is directed to, a double disc seal valve that has a pair of independently operable discs, each disc being sealed by a double pressure bellows sealing system having the sealing surfaces protected from the flow, and an interdisc chamber pressurized to form an aerodynamic or hydrodynamic seal to provide additional sealing of high pressure, high temperature, erosive solid or fluid flow systems.

SUMMARY

The present invention relates to a double disc seal valve provided with a pair of disc valves, a double pressure bellows sealing system for each disc valve, and an intermediate or interdisc chamber that is pressurized to provide sealing of high pressure, high temperature, erosive solid or fluid flow systems.

It is therefore an object of the present invention to provide a seal valve which may be used successfully in erosive solid of fluid flow systems.

A further object of the present invention is a provision of a seal valve which may be used successfully in the sealing of high pressure, high temperature flow systems.

Yet a further object of the present invention is the provision of a double disc seal valve provided with two independently operable disc valves, a pressurized double bellows sealing system for each disc valve and a pressurized interdisc or intermediate chamber formed between the disc valves to provide sealing of high pressure, high temperature, erosive solids or fluid flow systems.

Yet a further object of the present invention is the provision of a seal valve having a chamber formed in the flow passage by two disc valves spaced apart in the direction of flow that is pressurized to form an aerodynamic or hydrodynamic seal.

Yet a further object of the present invention is the provision of a seal valve having a "swept back" solids collection and dump system.

Yet a further object of the present invention is the provision of a double disc seal valve having pressurized double bellow systems sealing for each disc valve and a pressurized interdisc chamber which valve includes a control system that sequences the operation of the disc valves, pressurization of the bellows system and the interdisc chamber to provide a highly effective seal of high pressure, high temperature, erosive solid or fluid flow systems.

A still further object of the present invention is the provision of a seal valve provided with a plurality of sealing surfaces which are protected from the erosive action of solids or entrained solids flow systems.

A still further object of the present invention is the provision of such a seal valve having a "swept back" solids collection and dump system.

Other and further objects, features and advantages of the present invention will be apparent from the abstract of the disclosure, the background of the invention, this summary, the brief description of the drawings, the description of the presently preferred embodiment, and the claims.

BRIEF DESCRIPTION OF THE DRAWINGS

FIG. 4 is schematic of a control system for sequential operation of the double disc seal valve.

FIG. 5 is a cross-sectional view illustrating the bellows seal.

DESCRIPTION OF PREFERRED EMBODIMENTS

Figure 1:
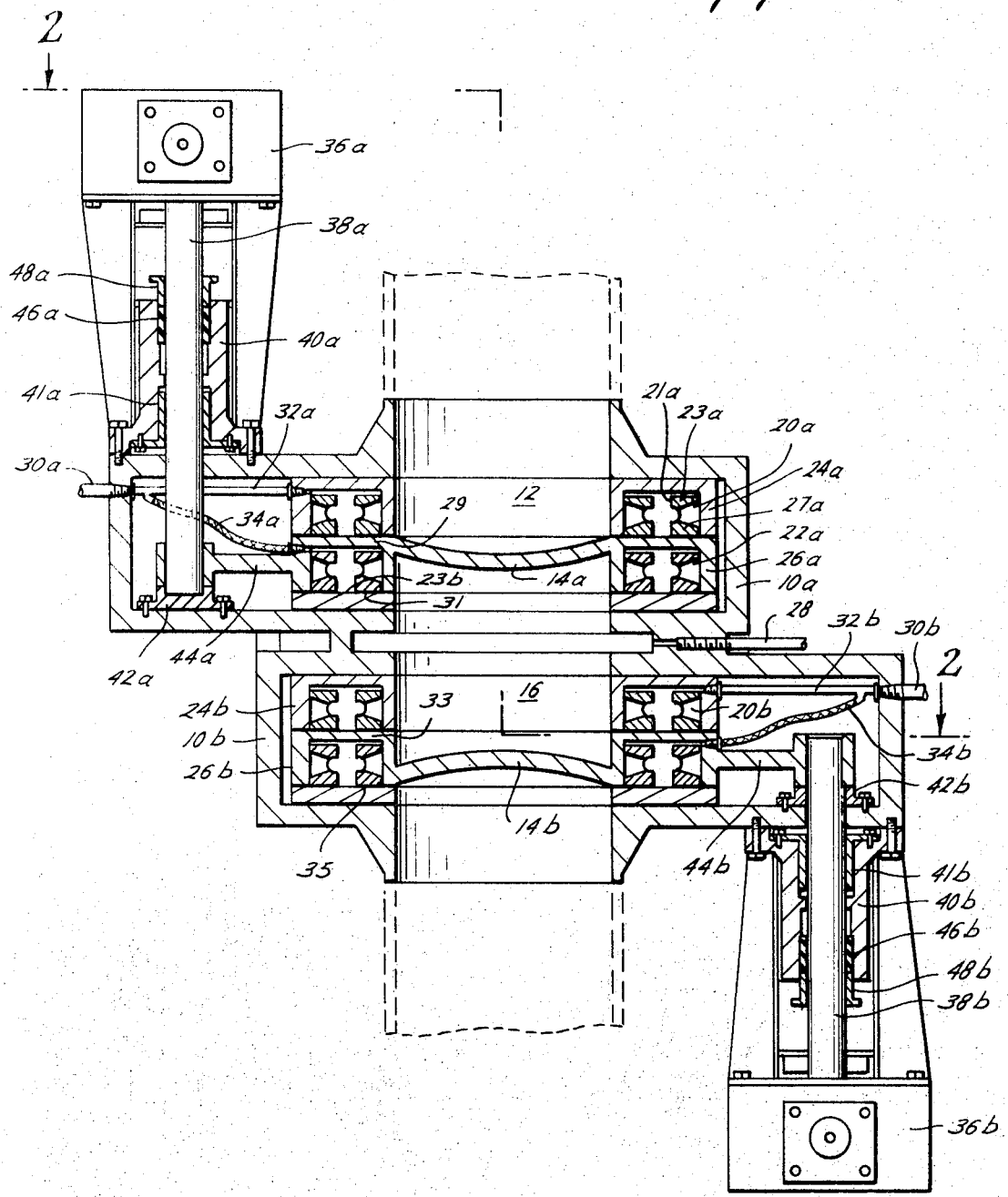
FIG. 1 is a sectional view taken along the line 1—1 of FIG. 2 illustrating the double disc seal valve according to the present invention.

Referring to the drawings, and particularly to FIG. 1, a double disc sealing valve is illustrated which includes the body 10, which is here shown made up of a pair of body sections 10a and 10b, which is provided with a central passage 12 extending therethrough. A pair of disc valves comprising an upstream sealing disc valve 14a and a downstream sealing disc valve 14b, are spaced apart to provide an interdisc or intermediate chamber 16 in the body 10 between the disc valves 14a and 14b. A pair of bellows seal units 20a and 22a are provided on each side of the upstream disc valve 14a, and a second pair of bellows seal units 20b and 22b are provided on each side of the downstream disc valve 16. As will be explained in more detail later, these bellows units comprise pressure sealing means which seal the upstream and downstream sides of the disc valves 14a and 14b.

A pressure injection port or passageway 28 is disposed in the body 10 to provide pressure in the interdisc or intermediate chamber 18 between the valve discs 14a and 14b. Thus, as will be explained in more detail later, as pressure is applied to the bellows sealing units 20a, 22a, 20b and 22b and into the interdisc or intermediate chamber 18 through the injection port or passageway 28, the disc valves 14a and 14b are each sealed on their upstream and downstream sides and are also provided with a desired pressure in the interdisc or intermediate portion which provides a very effective and efficient seal for high pressures and temperatures as well as for fluids containing solid or particulate matter.

Pressure is applied to the bellows sealing units 20a and 22a by means of the pressure port 30a and the pressure passageways 32a and 34a to the bellows sealing units 20a and 22a.

Similarly pressure is applied to the interior of the bellows sealing units 20b and 22b by means of the pressure injection port 30b and passageways 32b and 35b leading, respectively, into the pressure sealing bellows units 20b and 22b.

Each of the bellows sealing units are confined in a circumferentially extending bellows housing with an open side adjacent a surface to be sealed. Thus, the bellows housings 24a and 26a house the pressure bellows units 20a and 22b, and the bellows housings 24b and 26b house the pressure bellows units 20b and 22b, respectively. The bellows housings 26a and 26b are formed as an integral part of the disc valves 14a and 14b, respectively, and are carried by and rotate with the disc valves throughout their travel. Accordingly, the pressure passageways 34a and 34b for providing pressure into the interior of the bellows housings 26a and 26b are flexible conduits, as illustrated.

Each of the bellows units or systems, and with specific reference to bellows unit 20a illustrated in FIG. 5, includes a central flexible bellows member 21a that is connected to inner and outer bellows end plates 23a and 25a. Forming a portion of the outer bellows end plate 25a in a flexible, thin metal sealing plate 37a which is adapted to sealing engage a valve surface. The inner and outer bellows end plates 23a and 25a are also formed of metal and the inner bellows end plate 23a is welded in the bellows housing 24a and the outer bellows end plate 25a and seal plate 27a are free to move with expansion and contraction of the bellows 21a. Thus, upon application of pressure to the bellows 21a, the outer bellows end plate 25a and sealing plate 27a are moved outwardly of the bellows housing 24a until the flexible sealing plate engages and is deformed against a valve surface thereby providing an effective pressure seal for high temperature and pressures.

In the bellows sealing systems shown, the parts are of metal with the bellows 21a formed of a spring metal, such as a spring steel, the sealing plate 27a also being a thin deformable metal. Other materials may be used, however, to provide pressure seals depending upon the end use, the materials being chosen to accommodate the conditions of use, such as pressures, temperatures, fluid flows and the like.

The other pressure bellows sealing units, 22a, 20b and 22b, have the same arrangement of parts and mode of operation as described in connection with the bellows sealing unit 20a and, for convenience and to simplify the disclosure, no detailed description of each of them is deemed necessary or given.

Referring to FIG. 7, the annular extending surface 29 of the disc valve 14a provides a valve seating surface for the flexible seal plate 27a of the bellows sealing unit 20a, and an annular valve seating surface 31 is provided for engagement by the bellows seal plate, not shown, of the bellows sealing unit or system 22a. Similarly, the annular valve seating surface 33 on the disc valve 14b is engaged by the deformable seal plate of the bellows sealing unit or system 20b and the generally circumferential sealing surface 35 is similarly engaged by the deformable seal plate of the bellows sealing unit or system 22b.

While the deformable seal plates are not illustrated for the bellows seal units or systems 22a, 20b and 22c, they are the same as that of the bellows seal unit or system 20a, as previously mentioned.

Thus, a complete and effective seal is provided on the upstream and downstream sides of both of the disc valves 14a and 14b.

Each of the disc valves 14a and 14b are provided with an actuator 36a and 36b, respectively. Each of these actuators includes, and with specific reference to the actuator 36a, a stem 38a rotatably extending through a stuffing box 40a, a bearing sleeve 41a, a journal bearing 42, which stem 42a is secured to the extending arm 44a of the disc valve 14a. The stuffing box 40a includes an annular seal 46a and the gland 48a to provide a seal about the stem 38a. The same parts are provided for the actuator 36b and the reference letter "b" has been added to the numerals corresponding to those of the actuator 36a.

Figure 2:
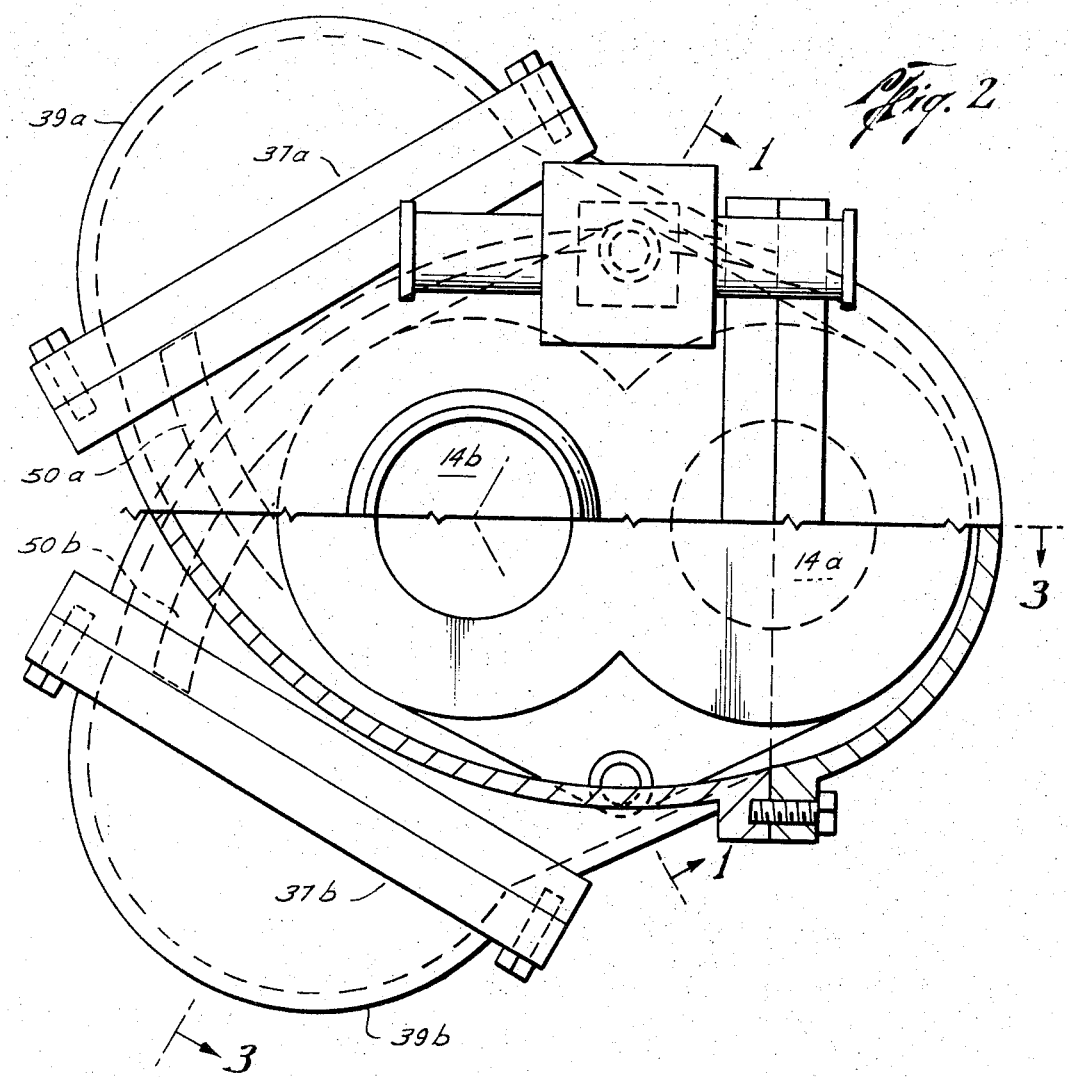
FIG. 2 is a top view of the double seal disc valve taken along the line 2—2 of FIG. 1.
Figure 3:
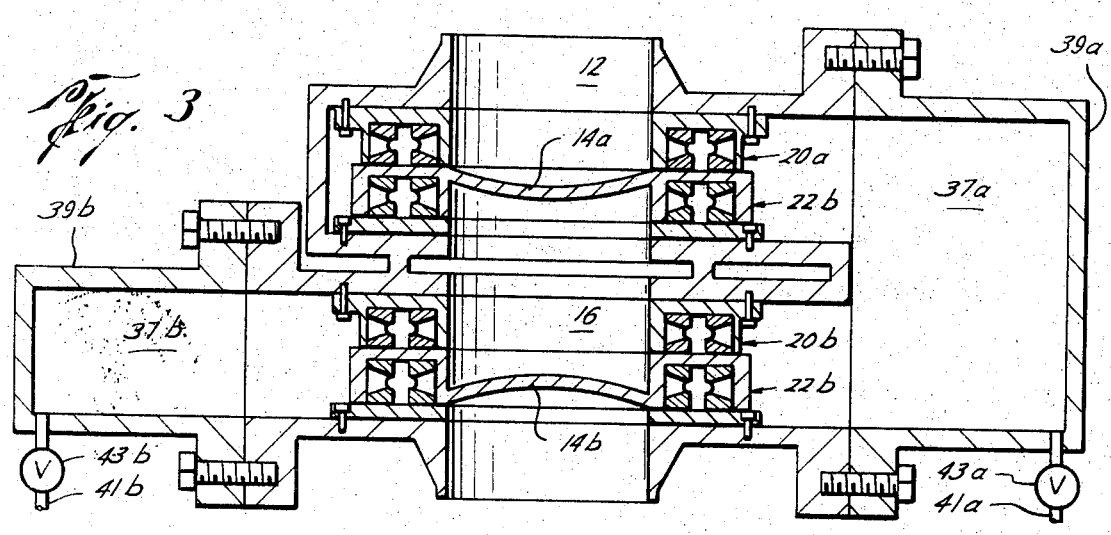
FIG. 3 is a sectional view of the double disc seal valve taken along the line 3—3 of FIG. 2.

As best illustrated in FIG. 2, guide members are provided, here shown as the guide ribs 50a and 50b, to guide the disc valves 14a and 14b in their arcuate travel.

Thus, actuation of the actuators 36a and 36b rotates the disc valves 14a and 14b throughout their respective travels into an open and a closed position.

For simplification of the disclosure, the details of the actuators 36a and 36b for actuating the stems 38a and 38b and in turn the disc valves 14a and 14b have been eliminated. Any desired means may be utilized which may be manual, mechanical, electric, pneumatic, hydraulic, and the like, as desired.

While any desired means may be utilized to actuate the disc valves 14a and 14b to open and closed position and to pressurize the pressure seals and the intermediate pressure chamber, one aspect of the invention includes a control system that sequences the actuation of the disc valves, and pressurization of the bellows systems and of the interdisc or intermediate chamber, which is illustrated in FIG. 4, to which reference is now made.

The sequential control system is schematically illustrated and includes a command signal, which is an open, close and stay switch, which provides a command signal to rotary actuator 36a for the upstream disc valve 14a, and provides a signal to each of the gates 52, 54, 56, 58, 60 and 62, through which signals are provided to their respective solenoid valves 64, 66, 68, 70 and 72, which direct pneumatic fluid from the fluid supply header line 74, from a suitable source, now shown, to the bellows systems 20a and 22a, the intermediate pressure chamber 16, and bellows system 20b and 22b. The gate valves do not permit actuation of their respective solenoid valves until all signals are input to the particular gate valve. Accordingly, upon actuating a "close" signal from command signal 50, a signal is provided to the upstream rotary actuator 36a which first closes the upstream disc valve 14a to prevent any further flow of solids through the valve. Once the rotary actuator 36a has completed closing upstream disc valve 14a, and end of stroke signal is provided to the gates 52, 54, 56, and 58, which completes the input signals to gates 52, 54 and 58, thus actuating solenoid valves 64 and 66, which permits pressure in the pneumatic supply lines 76 and 78 to flow into bellows systems 20a and 22a and, at the same time, causes actuation of rotary actuator 36b which closes the downstream disc valve 14b. Once the rotary actuator 36b closes the downstream disc 14b, an end of stroke signal is provided to the gates 56, 60 and 62, which permits pneumatic pressure to flow into bellows unit or system 20b through pneumatic pressure line 80 and to flow into bellows unit or system 22b through pneumatic pressure line 82 by actuation of solenoid valves 70 and 72, respectively. At the same time an input command is provided to complete the input signals to gate 56 which then actuates the solenoid 68 to the position illustrated and causes the pressurization of the intermediate chamber 16 by means of providing pneumatic pressure through the line 88, the solenoid valve 68 to the intermediate pressure chamber 16.

The solenoid valves are illustrated in the position in FIG. 4 as shown upon actuating the rotary actuators into the closed position.

The command signal includes a "hold" or "stay" position and an "open" position which provides a signal to the and gates which in turn provides signals to the solenoid valves. The position of the solenoid valves and flow lines in these positions has not been shown and is not described in detail, since it is deemed unnecessary and is omitted to shorten the disclosure. In short, however, when the command signal gives a signal to open the disc valves 14a and 14b, a signal is given which causes the solenoid valves 64, 66, 68, 70 and 82 to move to a position which releases pressure from the bellows systems and the intermediate chamber, and after a short time delay to permit depressurization, the rotary actuators are actuated to open their respective disc valves.

As the command signal, and gates, solenoid valves, are all conventional, are readily available to the trade, no detailed description thereof is deemed necessary or given.

As best seen in FIG. 2, each of the disc valves has a swept-back solids collection chamber 37a and 37b which are closed by the removable access cover plates 39a and 39b. A drain pipe 41a and 41b drains the swept-back solids collection chambers 37a and 37b, respectively, by means of opening and closing the dump valves 43a and 43b, respectively.

As shown in the drawings, the various parts are removably secured together by any suitable means, such as the threaded studs as illustrated.

In operation, and assuming that the valve is in open position, a command signal is given by pressing in the "close" button, not shown, of the command 50. This causes the upstream disc valve 14a to close first and, upon its closing, the upstream pair of bellows units or systems 20a and 22a are pressurized and the downstream disc valve 14b is actuated to closed position. Once the downstream valve disc 14b is in closed position, the downstream bellows units or systems 20b and 22b are pressurized and pressure is also applied to the intermediate or interdisc chamber 16 between the upstream valve disc 14a and the downstream valve disc 14b. This provides an effective seal for very high pressures.

When it is desired to open the valve, the open switch of the command signal 50 is depressed, which first releases fluid pressure from the bellows systems and intermediate pressure chamber 16 and then actuates the actuators 36a and 36b which open the disc valves 14a and 14b.

It is noted that the bellows sealing arrangement is out of the flow path through the flow passage 12 of the valve, thus making it highly satisfactory and desirable for fluids containing abrasive or erosive particulate or solid materials. Also, by providing an intermediate pressure chamber 16, relatively high pressures are effectively sealed by the dual disc valve. Normally the bellows systems and intermediate pressure chamber are pressurized to pressures of the order of those encountered in use.

Accordingly, the present invention is well suited and adapted to attain the objects and ends and has the advantages and features mentioned as well as others inherent therein.

While a presently preferred embodiment of the invention has been given for purposes of disclosure, changes in details and arrangement of parts may be made which are within the spirit of the invention as defined by the scope of the appended claims.

What is claimed is:

1. A valve comprising, a body having a flow passage extending therethrough, a pair of disc valves arranged for movement to close and open the flow passage, said disc valves being spaced apart from one another in the direction of flow in the flow passage thereby providing an intermediate pressure chamber between the discs when the discs are in closed position, means for opening and closing the disc valves, pressure-sealing means to seal the disc valves relative to the flow passage when the discs are in closed position, and means for providing pressure to the pressure-sealing means and to the intermediate pressure chamber.

2. The invention of claim 1 where, the pressure-sealing means comprises an annular pressure-expansible sealing member on each side of each of the disc valves adjacent to and out of the path of flow in the flow passage, and annular housing means confining each of the pressure-expansible sealing member adjacent to and out of the path of flow in the flow passage.

3. The invention of claim 2 where, one each of the annular housings and annular pressure-expansible sealing members are carried by one each of the discs, the upstream surface of the carried housing means comprises a valve seating surface for the other of the annular sealing means, and an annular valve seating surface sealingly engageable by the disc-carried annular sealing ring.

4. The invention of claim 1 where, the means for opening and closing the disc valve are independently operable.

5. The invention of claim 1 where, the means for opening and closing the disc valves and for providing pressure to the pressure-sealing means in the intermediate pressure chamber comprise means to actuate the upstream disc valve to closed position, means responsive to closing the upstream disc valve providing pressure to the pressure-sealing means sealing the upstream valve disc and actuating the downstream disc valve to closed position, and means responsive to closing the downstream disc valve providing pressure to the pressure-sealing means sealing the downstream disc valve and to the intermediate chamber formed by the closing of the upstream disc valve and the downstream disc valve.

* * * * *